United States Patent
Heckman et al.

(10) Patent No.: US 10,760,325 B2
(45) Date of Patent: Sep. 1, 2020

(54) VACUUM INSULATED GLASS WINDOWS WITH FRICTION REDUCTION COMPOSITIONS AND METHODS OF MAKING THE SAME

(71) Applicant: Corning Incorporated, Corning, NY (US)

(72) Inventors: Michael Paul Heckman, Greenwood, NY (US); Linda Frances Reynolds-Heffer, Horseheads, NY (US); Wageesha Senaratne, Horseheads, NY (US)

(73) Assignee: Corning Incorporated, Corning, NY (US)

(*) Notice: Subject to any disclaimer, the term of this patent is extended or adjusted under 35 U.S.C. 154(b) by 1 day.

(21) Appl. No.: 15/779,973

(22) PCT Filed: Nov. 29, 2016

(86) PCT No.: PCT/US2016/063898
§ 371 (c)(1),
(2) Date: May 30, 2018

(87) PCT Pub. No.: WO2017/095764
PCT Pub. Date: Jun. 8, 2017

(65) Prior Publication Data
US 2018/0363361 A1    Dec. 20, 2018

Related U.S. Application Data

(60) Provisional application No. 62/269,128, filed on Dec. 18, 2015, provisional application No. 62/261,237, filed on Nov. 30, 2015.

(51) Int. Cl.
*E06B 3/663* (2006.01)
*C03C 17/00* (2006.01)
(Continued)

(52) U.S. Cl.
CPC ............ *E06B 3/663* (2013.01); *C03B 23/245* (2013.01); *C03C 17/007* (2013.01);
(Continued)

(58) Field of Classification Search
CPC ........ E06B 3/66; E06B 3/663; E06B 3/66304; E06B 3/6612; E06B 3/66333
See application file for complete search history.

(56) References Cited

U.S. PATENT DOCUMENTS

| 6,946,171 | B1 | 9/2005 | Aggas |
| 8,679,599 | B2* | 3/2014 | Grzybowski ....... E06B 3/66304 428/34 |

(Continued)

FOREIGN PATENT DOCUMENTS

| CN | 105440373 A | 3/2016 |
| CN | 105968810 A | 9/2016 |

(Continued)

OTHER PUBLICATIONS

International Search Report and Written Opinion of the International Searching Authority; PCT/US2016/063898; dated Mar. 8, 2017; 15 Pages; European Patent Office.
(Continued)

*Primary Examiner* — Donald J Loney
(74) *Attorney, Agent, or Firm* — Svetlana Z. Short

(57) ABSTRACT

A window with low frictive compositions and methods of making the same. The low frictive composition is applied to top portion of at least one glass bump contacting an opposing pane in a window. The low frictive composition may include an inorganic powder and a binder. The inorganic powder includes disulfide, molybdenum disulfide, tungsten diselenide, and molybdenum diselenide. The binder includes silsesquioxanes and alkali silicates.

12 Claims, 4 Drawing Sheets

(51) Int. Cl.
  C03C 23/00    (2006.01)
  C03C 27/10    (2006.01)
  C03B 23/24    (2006.01)
  C04B 28/26    (2006.01)
  C09D 7/61     (2018.01)
  C09D 7/20     (2018.01)
  C03C 17/22    (2006.01)
  C09D 1/02     (2006.01)
  C09D 5/00     (2006.01)
  C09D 183/04   (2006.01)
  C09K 5/14     (2006.01)
  C08K 3/30     (2006.01)
  C04B 111/00   (2006.01)
  C08K 11/00    (2006.01)
  C08K 13/08    (2006.01)
  C08K 3/26     (2006.01)
  C08K 3/34     (2006.01)
  E06B 3/66     (2006.01)
  E06B 3/673    (2006.01)

(52) U.S. Cl.
  CPC ......... *C03C 17/009* (2013.01); *C03C 17/22* (2013.01); *C03C 23/002* (2013.01); *C03C 23/0025* (2013.01); *C03C 27/10* (2013.01); *C04B 28/26* (2013.01); *C09D 1/02* (2013.01); *C09D 5/00* (2013.01); *C09D 7/20* (2018.01); *C09D 7/61* (2018.01); *C09D 183/04* (2013.01); *C09K 5/14* (2013.01); *E06B 3/66304* (2013.01); *C03C 2217/28* (2013.01); *C03C 2217/445* (2013.01); *C03C 2217/47* (2013.01); *C03C 2217/475* (2013.01); *C04B 2111/00362* (2013.01); *C04B 2111/00482* (2013.01); *C08K 3/30* (2013.01); *C08K 11/00* (2013.01); *C08K 13/08* (2013.01); *C08K 2003/265* (2013.01); *C08K 2003/3009* (2013.01); *C08K 2003/343* (2013.01); *C08K 2201/001* (2013.01); *E06B 3/6612* (2013.01); *E06B 3/66333* (2013.01); *E06B 3/673* (2013.01); *E06B 2003/66338* (2013.01); *Y02W 30/97* (2015.05)

(56) References Cited

U.S. PATENT DOCUMENTS

| | | |
|---|---|---|
| 2014/0186557 A1 | 7/2014 | Grzybowski et al. |
| 2015/0027168 A1 | 1/2015 | Dabich, II et al. |
| 2017/0022100 A1 | 1/2017 | Masters et al. |
| 2017/0153389 A1 | 6/2017 | Chen et al. |

FOREIGN PATENT DOCUMENTS

| | | |
|---|---|---|
| FR | 2925507 A1 | 6/2009 |
| WO | 2017095784 A1 | 6/2017 |

OTHER PUBLICATIONS

Kim et al; "Vacuum Insulated Glass Units and Methodology for Manufacturing the Same"; Filed as U.S. Appl. No. 15/336,879, filed Oct. 28, 2016; 29 Pages.

* cited by examiner

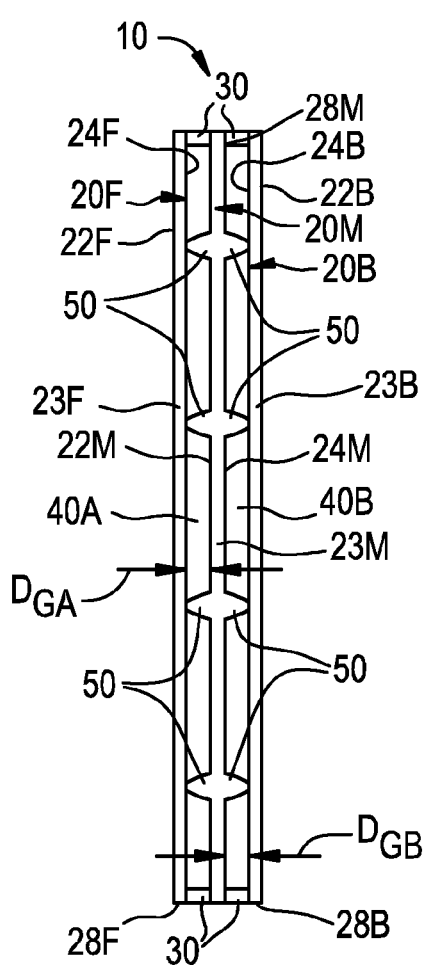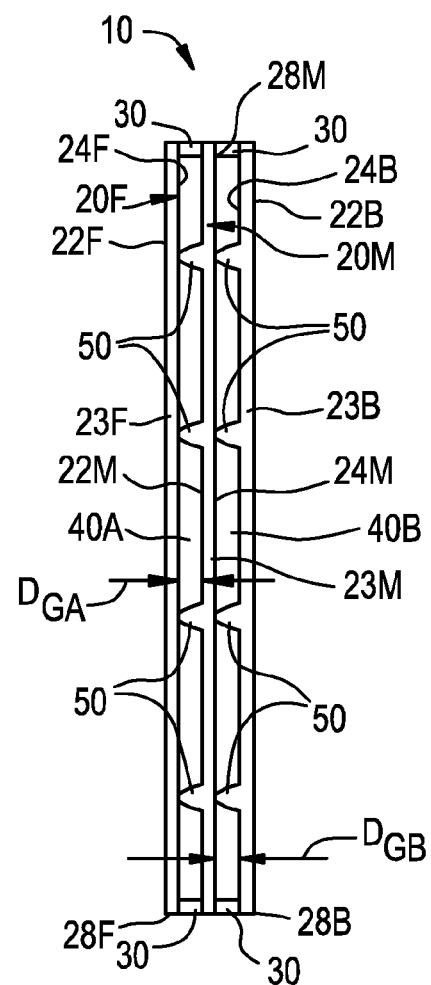

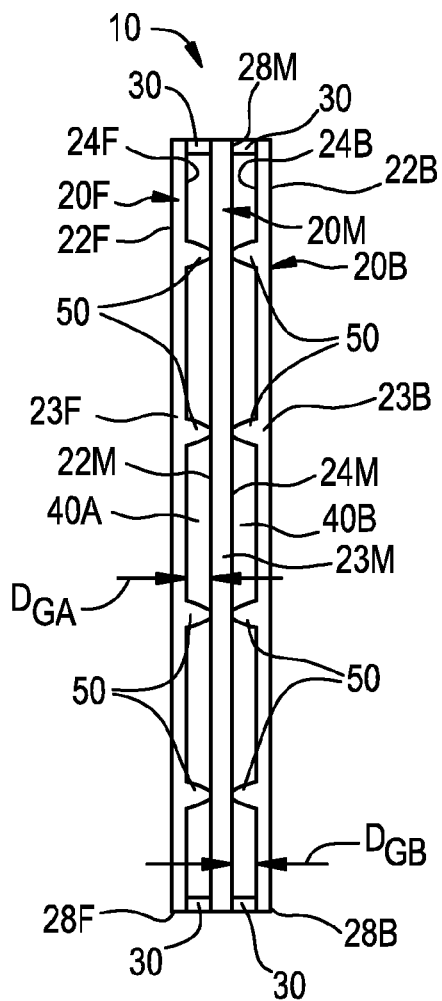

VACUUM INSULATED GLASS WINDOWS WITH FRICTION REDUCTION COMPOSITIONS AND METHODS OF MAKING THE SAME

CROSS-REFERENCE TO RELATED APPLICATIONS

This application claims the benefit of priority under 35 U.S.C § 365 of International Patent Application Serial No. PCT/US2016/063898 filed on Nov. 29, 2016 designating the United States of America, the content of which is relied upon and incorporated herein by reference in its entirety. which in turn claims the benefit of priority under 35 U.S.C. § 119 of U.S. Provisional Application Ser. Nos. 62/261,237 and 62/269,128, filed on Nov. 30, 2015 and on Dec. 18, 2015, the contents of which are relied upon and incorporated herein by reference in their entirety.

BACKGROUND

Field

The present disclosure relates generally to vacuum insulated glass (VIG) windows with low frictive compositions and methods of making the same.

Technical Background

Vacuum-insulated glass (VIG) windows typically include two or more glass panes with an evacuated space (i.e., vacuum) located between the panes. The overall construction provides improved thermal and noise insulating properties compared to ordinary glass windows. To prevent sagging and contact between adjacent glass panes, discrete spacers can be placed between adjacent glass panes. The spacers can be made of aluminum, plastic, ceramic, or glass and are conventionally distinct from the glass panes, i.e., they are separate, discrete elements disposed and fixed between the glass panes. Spacers within the vacuum space may cause damage to the glass panes during thermal expansion of the two or more panes.

Accordingly, a need exists for friction reducing compositions for use between pane contact points in VIG windows.

SUMMARY

According to another embodiment of the present disclosure, a low friction coating is disclosed. In embodiments, the low friction coating comprises a friction reduction material. In embodiments, the friction reduction material comprises an inorganic powder and a binder. In embodiments, the inorganic powder comprises tungsten disulfide, molybdenum disulfide, tungsten diselenide, molybdenum diselenide, or combinations thereof. In further embodiments, the binder comprises methyl silsesquioxanes, phenyl silsesquioxanes, and alkali silicates. In further embodiments, the friction reduction material may be used between a glass-bump top portion contacting an opposing glass pane surface in a vacuum insulated glass (VIG) window.

According to one embodiment of the present disclosure, a vacuum insulated glass (VIG) window is described. The VIG window comprises a first glass pane, a second glass pane, a plurality of glass-bumps, a friction reduction material, and an edge seal. The first and second glass panes each comprise a glass material, an inner surfaces opposite an outer surface, and outer edges. In embodiments, the plurality of glass-bumps is formed from the first glass material on the first inner surface of the first glass pane. The first glass pane may face the second glass pane such that the plurality of glass-bumps on the first inner surface are adjacent the second inner surface of the second glass pane. In embodiments, the friction reduction material is located between at least one of the plurality of glass-bumps and the second inner surface. In embodiments, the edge seal joins the first and second edges of the first and second glass panes and forms a sealed interior region between the inner surfaces of the first and second glass panes.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings.

FIG. 4A is a cross-sectional view similar to FIG. 2 and that illustrates an example embodiment of a three-pane VIG window having a middle glass pane with glass-bump spacers formed in both surfaces of the middle pane.

FIG. 4B is similar to FIG. 4A, except that the second set of glass-bump spacers are formed in the back glass pane rather than the middle glass pane.

FIG. 4C is similar to FIG. 4A, except that the first and second sets of glass-bump spacers are formed in the front and back glass panes rather than the middle glass pane.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

Figure 1:
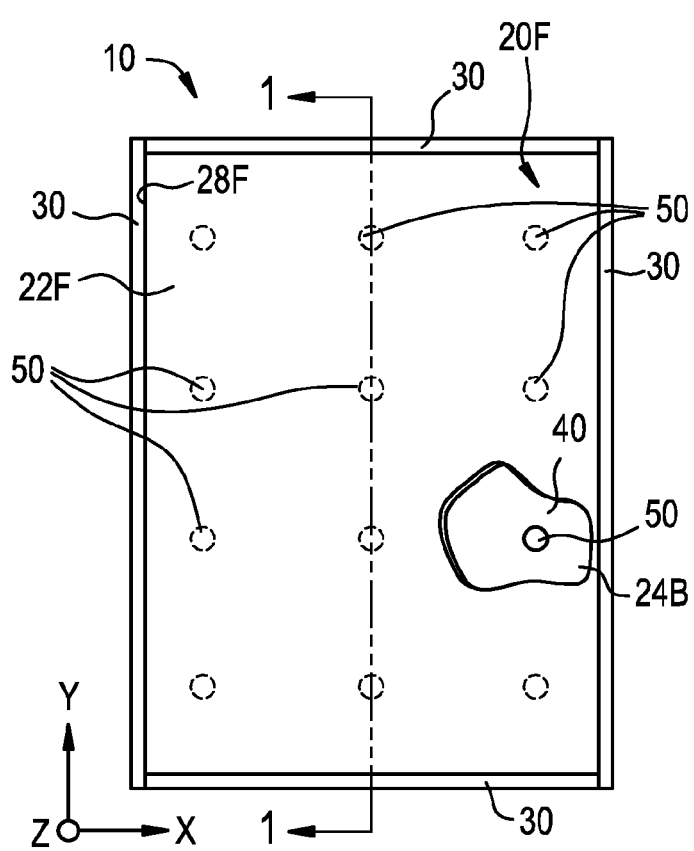
FIG. 1 is a front-on view of an example two-pane VIG window according to an exemplary embodiment.

FIG. 1 is a front-on view of an example embodiment of a VIG window 10. VIG window 10 may contain two panes or three panes. In one embodiment, VIG window 10 includes a first glass pane spaced apart from and positioned substantially parallel to a second glass pane. The first and second glass panes each include an inner surface opposite an outer surface. The first and second glass panes also each include at least one outer edge. The first and second glass panes are made from a glass material. In other embodiments, VIG window 10 may include a third glass pane including an inner surface opposite an outer surface, and at least one outer edge. Third glass pane is also formed from a glass material. The third glass pane may be positioned between and substantially parallel the first and second glass pane, or opposite the outside surface of either the first or second glass pane.

Figure 2:
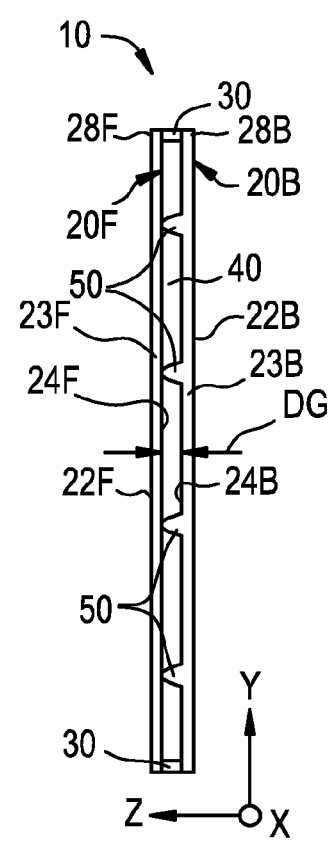
FIG. 2 is a cross-sectional view of the VIG window of FIG. 1 as viewed in the direction 1-1.

FIG. 2 is a cross-sectional view of the example two-pane VIG window 10 of FIG. 1 as viewed in the direction 1-1. Cartesian coordinates are shown for reference. VIG window 10 includes a front glass pane 20F and a back glass pane 20B disposed opposite to and substantially parallel to one another. In embodiments, front glass pane 20F may be configured to be the outside glass pane when VIG window 10 is installed on a structure (e.g., building). Front glass pane 20F has a body portion 23F made of a first glass material and has outer and inner surfaces 22F and 24F and an outer edge 28F. Likewise, back glass pane 20B has a body portion 23B made of a second glass material and has outer and inner surfaces 22B and 24B and an outer edge 28B. In an example embodiment, the first and second glass materials making up body portions 23F and 23B are the same. In a further example embodiment, either or both of the first and second glass materials making up body portions 23F and 23B can comprise chemically-strengthened glass, tempered glass, or an ion-exchanged glass. Examples of glass compositions and strengthening techniques are provided in U.S. Pat. No. 8,679,599 the entire content of which is incorporated by reference herein. Front and back glass panes 20F and 20B are separated by a distance DG as measured from their respective inner surfaces 24F and 24B.

Figure 3:
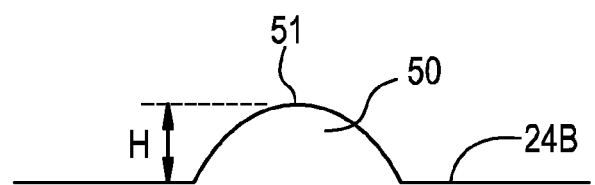
FIG. 3 is a close-up cross-sectional view of an example glass-bump spacer.

VIG window 10 further includes spacers 50. In embodiments, spacers 50 are a plurality of glass-bump spacers 50 integrally formed in inner surface 24B of back glass pane 20B. Glass-bump spacers 50 may also be formed on inner surface 24F of from glass pane 20F. FIG. 3 is a close-up view of an example glass-bump spacer 50. Note that glass-bump spacers 50 are integrally formed in back glass pane 20B and are not added as separate or discrete elements to VIG window 10. Thus, glass-bumps 50 are formed from (and thus consist of) the same material as back glass pane 20B, and in fact are extensions of body portion 23B. Example methods of forming glass-bumps 50 (including by laser-induced radiation) are discussed in U.S. Pat. No. 8,679,599 the entire content of which is incorporate by reference herein. Example methods of etching glass-bumps 50 from glass pane 20B, for example, are provided in U.S. Patent Application No. 62/248,715 entitled "VACUUM INSULATED GLASS UNITS AND METHODOLOGY FOR MANUFACTURING THE SAME" the entire content of which is incorporated by reference herein. Spacers 50 may also be discrete metal, ceramic, aluminum, plastic, or glass spacers between panes 20B and 20F.

In an example embodiment, glass-bump spacers 50 are regularly spaced with respect to one another. Because glass-bump spacers 50 are integrally formed in body portion 23B, they are substantially invisible when the VIG window 10 is viewed at regular (i.e., substantially normally incident) viewing angles. Consequently, glass-bumps 50 are shown in phantom (dotted lines) in FIG. 1. Glass-bump 50 has a "tip" or "top portion" 51, as shown in FIG. 3. As discussed below, top portion 51 need not be rounded as is shown in FIG. 3. For example, top portion 51 may have a large radius of curvature or even a flat top portion. Glass-bump geometries according to the present disclosure are provided in U.S. patent application Ser. No. 14/808,790 entitled "GLASS BUMPS ON GLASS ARTICLES AND METHODS OF LASER-INDUCED GROWTH" the entire content of which is incorporated by reference herein. Glass-bump spacers 50 may contact front pane inner surface 24F and serve to maintain the separation distance DG between front and back glass panes 20F and 20B.

In embodiments, glass-bump spacers 50 contact pane inner surface 24F. In exemplary embodiments, a friction reduction material 25 is located between top portion 51 of glass-bump spacer 50 and pane inner surface 24F. During assembly, VIG window 10 may be heated or baked to between about 300° C. to about 450° C. to remove inorganics from the sealed interior region or to cure glass frit acting as edge seal 30, or both. Accordingly, friction reduction material 25 is formed during this baking of VIG window 10 from a precursor formulation. That is, organic material and gasses are removed from the precursor formulation. Accordingly, friction reduction material 25 precursor formulation may prevent glass-bump spacers 50 from adhering to pane inner surface 24F during this process.

After assembly, front glass pane 20F and back glass pane 20B may be substantially locked in position with respect to one another by the sealed edge around VIG window 10. Thermal expansion of the opposing panes can cause the glass-bump spacers 50 contacting pane inner surface 24F to move and drag across inner surface 24F. With force from about 40 N to about 160 N, or as much as 200 N of force, between a glass-bump spacer 50 and an opposing glass pane surface, movement of glass-bump 50 along a glass pane surface may cause damage to the glass-bump or glass surface and ultimate failure of VIG window 10. During thermal expansion in a conventional VIG window, the static coefficient of friction (CoF) between top portion 51 of glass-bump 50 and a surface of a glass pane for a load of about 40N to about 160 N (the load substantially orthogonal to the glass pane surface) can be from about 0.8 to 1.0, or even higher.

Friction reduction material 25 may prevent glass-bump spacers 50 from damaging to pane inner surface 24F, or visa versa, during thermal expansion of VIG window 10 opposing panes. That is, friction reduction material 25 may reduce friction between the plurality of glass-bumps 50 and the opposed, contacted glass pane by at least 20%, or from about 25% to about 97%, or even from about 50% to about 80%. The static CoF between top portion 51 of glass-bump 50 and a surface of glass for a load of about 40N to about 160 N (the load substantially orthogonal to the glass pane surface) separated by low emissivity layer 25 can be from about 0.03 to about 0.6, or even from about 0.15 to about 0.35, such as 0.05, 0.1, 0.15, 0.2, 0.25, 0.3, or 0.35, including all ranges and subranges therebetween.

Friction reduction material 25 within VIG window 10 may be formed from a precursor formulation. The precursor formulation may include an inorganic material. Inorganic material may be tungsten (IV) disulfide ($WS_2$), molybdenum disulfide ($MoS_2$), tungsten (IV) diselenide ($WSe_2$), molybdenum diselenide ($MoSe_2$), and combinations thereof. Other inorganic materials include those that are thermally stable at >300° C. and exhibit little to no outgassing under vacuum (e.g., <$10^{-4}$ torr). In embodiments, the inorganic material makes up about 1 wt. % to about 50 wt. %, or about 10 wt. % to about 40 wt. %, or even about 30 wt. % to about 40 wt. % of the precursor formulation. In embodiments, the inorganic material is a powder (not within the precursor formulation) having a particle size distribution of about 10 nm to about 4000 nm. Inorganic powder (not within the precursor formulation) may also have a median particle size D50 of about 40 nm to about 4000 nm, or about 40 nm to about 2000 nm, In embodiments, the inorganic powder (not within the precursor formulation) may also have an average particle size (APS) from about 40 nm to about 1500 nm. The inorganic material in the friction reduction material may act as the primary or contributing agent for friction reduction. In embodiments, the inorganic powder material has the appropriate particle size such that the material does not oxidize and change frictive properties during heating of VIG window 10 as described above. After heating of VIG window 10, about 90 wt. % to about 99 wt. % of the inorganic material remains in friction reduction material 25 from the precursor formulation deposited.

Figure 6:
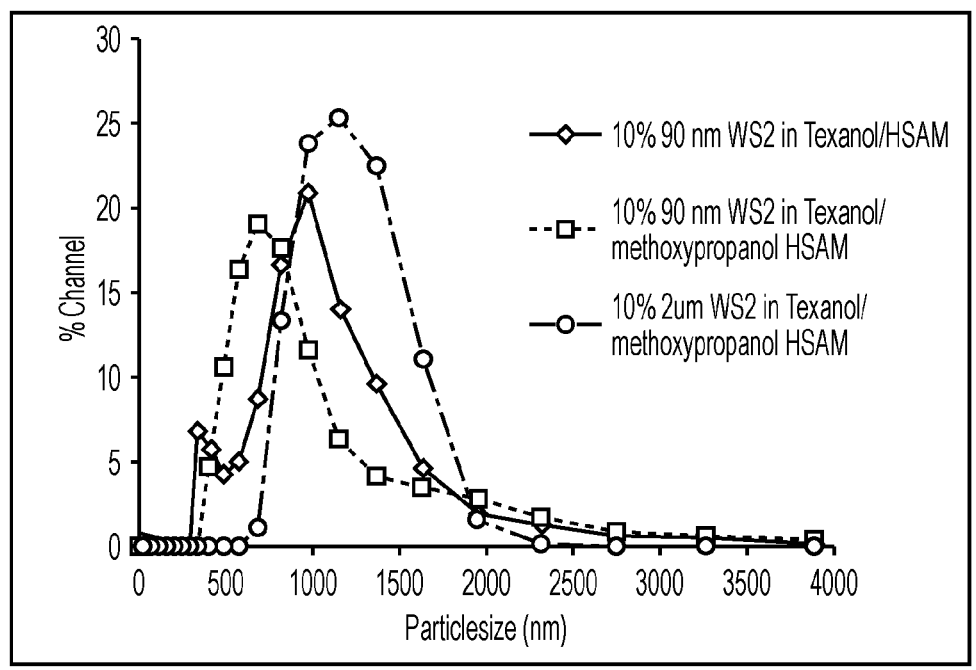
FIG. 6 is a particle size distribution plot of an inorganic powder in a friction reduction material precursor formulation according to an exemplary embodiment.

In addition to an inorganic material, the precursor formulation may include a binder, a filler composition, and/or an organic material. The organic material may comprise Texanol™, methoxypropanol, siloxanes, propylene glycol, and combinations thereof. The organic material may act as a solvent so that the other components of precursor formulation are able to be homogeneously mixed. Further, the organic material may reduce the viscosity of the precursor formulation such that it is able to be deposited onto an entire glass sheet, or at least one of glass-bumps spacers 50. In embodiments, the precursor formulation includes from about 1 wt. % to about 50 wt. % organic material. After assembly and heating or baking of VIG window 10, up to 95%, or even 99% of the organic material may be removed from the precursor formulation. That is, from about 0.01 wt. % to about 5 wt. % of the organic material remains in friction reduction material 25. In embodiments, the organic material has a low enough boiling point (e.g., <450° C.) such that it is removed from the precursor formulation during heating. Thus, high boiling point (e.g., >500° C.) organic materials may not be preferred according to some embodiments. In other embodiments, the inorganic powder that is dispersed into the organic material has a particle size distribution of about 10 nm to about 4000 nm. This particle size distribution of the inorganic powder in the organic material may be narrower due to the particles agglomerating into larger particles. Inorganic agglomerate particle size may also have a median particle size D50 of about 90 nm to about 4000 nm, or about 90 nm to about 2000 nm. In embodiments, the agglomerated inorganic powder may have an average particle size (APS) from about 90 nm to about 1500 nm. FIG. 6 provides the particle size distribution curves (determined by light scattering measurement) for 10 wt. % of tungsten disulfide ($WS_2$) with 90 nm and 2 micron APS in different precursor formulations including different organic solvents and HSAM.

The precursor formulation may also include a binder which is a glass surface reactive agent. In embodiments, the binder comprises silicon polymers, alkali silicates, and combinations thereof. Example silicon polymers include methyl silsesquioxanes (e.g., HardSil AM (HSAM) by Gelest Inc., 512B by Honeywell Inc.), phenyl silsesquioxanes (e.g., HardSil AR by Gelest, Inc.), polyhedral oligomeric silsesquioxanes (POSS™) (e.g., Octa(trichlorosilylethyl)-POSS™, Octa(chlorodimethylsilylethyl)-POSS™, Octa(dichloromethylsilylethyl)-POSS™), incompletely hydrolyzed POSS, brideged silsesquioxanes, and polysilsesquioxanes (e.g. polymethylsilsesquioxanes, polyphenylsilsesquioxanes). Example alkali silicates include sodium silicates, potassium silicates, lithium silicates, and combinations thereof. The binder material may help the precursor formulation (and the friction reduction material 25 subsequent heating of VIG window 10) adhere to the top portion 51 of glass-bump spacer 50, for example. The particular binder may depend on the properties of the glass material making up glass panes 20F, 20B, and 20M. Other possible binders include those that are thermally stable at >300° C. and that exhibit little to no outgassing under vacuum. Thus, surfactants are not preferred in some embodiments. In embodiments, the binder makes up about 1 wt. % to about 50 wt. % of the precursor formulation. After VIG window 10 is heated, friction reduction material 25 may include from about 1 wt. % to about 70 wt. % binder. In embodiments, the binder is in sufficient quantity to allow binding of the friction reduction material 25 to glass. In other embodiments, the binder is not is excess quantity such that the low frictive properties are decreased or that the thermal conductivity (e.g., >1 W/m·K) of the friction reduction material 25 increased. After heating of VIG window 10, about 75 wt. % to about 99 wt. % of the binder remains in friction reduction material 25 from the precursor formulation deposited.

In embodiments, the precursor formulation includes a filler composition to maintain or reduce the thermal conductivity of the friction reduction material 25. For example, the filler composition may have a thermal conductivity of about 0.01 W/m·K to about 1 W/m·K. In embodiments, the filler composition comprises calcium silicate, cork, chalk, mica, and combinations thereof. Other possible filler compositions include those that are thermally stable at >300° C. and that exhibit little to no outgassing under vacuum. After heating of VIG window 10, about 75 wt. % to about 99 wt. % of the filler composition remains in friction reduction material 25 from the precursor formulation deposited.

Figure 5:
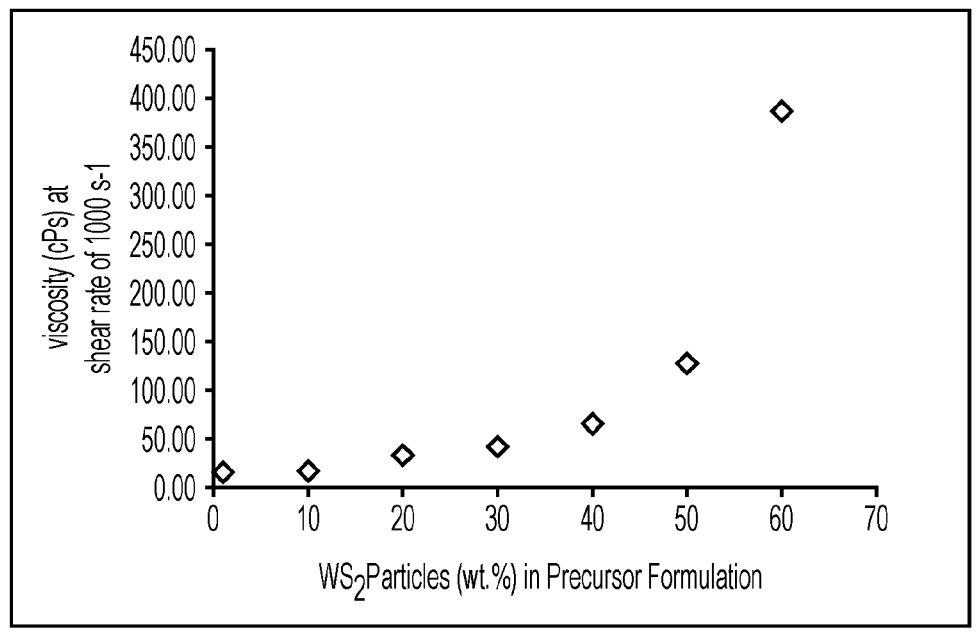
FIG. 5 is a plot of the viscosity (in cPs) of a friction reduction material precursor formulation at a shear rate of $1000\ s^{-1}$ vs. concentration of tungsten disulfide according to an exemplary embodiment.

The precursor formulation may have a viscosity from about 0.01 cPs to about 400 cP at an example shear rate of 1000 $s^{-1}$. FIG. 5 provides a plot of the viscosity (in cPs) of precursor formulation at a shear rate of 1000 $s^{-1}$ based on the wt. % of the inorganic powder (i.e., tungsten disulfide) in the precursor formulation. The tungsten disulfide particles in the precursor formulation of FIG. 5 have a D50 of 90 nm. Friction reduction material 25 (formed from the precursor formulation) may have a thermal conductivity from about 0.01 W/m·K to about 1 W/m·K.

Friction reduction material 25 between inner surfaces 24F and 24B of front glass pane 20F and back glass pane 20B may be formed by depositing the precursor formulation onto surfaces of front glass pane 20F or back glass pane 20B by physical vapor deposition, pyrolysis, sputtering, 3-D printing, by air transport, jetting or dispensing from a nozzle, or by other conventional methods. Jetting (using air to launch the friction reduction material 25) onto the glass-bump spacers 25 may be advantageous when it is desirable to keep the dispenser and glass surface separate. However, adjusting air pressure during jetting of the precursor formulation may need to be optimized to lessen or reduce splattering of the precursor formulation. Splattering of the precursor formulation may be seen after baking (i.e., heating) the assembled VIG window 10. Friction reduction material 25 between inner surfaces 24F and 24B may be formed by heating or baking assembled VIG window 10 between about 100° C. to about 500° C.

In an exemplary embodiment, VIG window 10 in FIG. 2 includes friction reduction material 25 on surface 24F (not shown). In embodiments, friction reduction material 25 is isolated between at least one of the plurality of glass-bumps and inner surface 24F. For example, friction reduction material 25 may be on top portion 51 of at least one or a fraction or all of the plurality of glass-bumps spacers 50 in VIG window 10. In embodiments, the precursor formulation is selectively deposited to have a diameter of at least 20% up to 150%, or even from 50% to 100%, of the diameter of glass-bump spacer 50. Glass-bump spacer may have a diameter of 200-500 microns for example. In embodiments, friction reduction material 25 has a thickness of about 1 nm to about 20 microns, or from about 500 nm to about 2 microns, between at least one of the plurality of glass-bumps spacers 50 and inner surface 24F.

In an example embodiment, glass panes 20F and 20B are formed from soda-lime glass, an alkali aluminosilicate glass, borosilicate glass, Gorilla® Glass, which in a further example embodiment have a respective thickness TG between 0.5 mm and 5 mm (e.g., 0.5, 0.7, 1, 1.5, 2, 2.5, 3, 3.5, 4, 4.5 or 5 mm). While soda-lime glass is the most common window glass, VIG window 10 disclosed herein can be applied to any type of glass in which integral glass-bump spacers 50 can be formed using the methods described in detail below. For example, the VIG window disclosed herein applies to low-iron ("ultra-clear" or "ultra-white") window glasses, as well as to the other glasses introduced and discussed below. In embodiments, glass panes 20F and 20B are transmissive at about 420 nm to about 750 nm. In an example embodiment, glass-bump spacers 50 have a height ("bump height") H in the range from 50 μm to 300 μm, or from 75 μm to 150 μm, and or even from 100 μm to 120 μm. In an example embodiment, glass panes 20F and 20B have substantially the same thickness TG.

An edge seal 30 may be provided at respective outer edges 28F and 28B between at least a portion of each outer edge to provide a hermetic seal. Edge seal 30 between front and back glass pane inner surfaces 24F and 24B defines a sealed interior region 40. In embodiments, the edge seal 30 is at least partially laser-induced. Edge seal 30 may be a seal by glass frit, a seal directly between glass panes 20B and 20F, or a seal between glass panes 20B and 20F with a shim or glass segment there between. In embodiments, edge seal 30 between glass panes 20B and 20F with a low emissivity layer there between may be formed as provided in co-pending U.S. Patent Application No. 62/260,802 entitled "LASER WELDING TRANSPARENT GLASS PANES USING A LOW EMISSIVITY COATING" the entire content of which is incorporated by reference herein. In other embodiments, edge seal 30 between glass panes 20B and 20F may be formed using low melting glass or thin absorbing films as provided in U.S. Patent Publication No. 2015/0027168, the entire content of which is incorporated by reference herein.

In embodiments where glass pane surfaces 24B and 24F cannot be brought into sufficient proximity to each other to form a laser-induced edge seal 30 (e.g., ≤1 micron apart), alternative embodiments of forming edge seal 30 are according to embodiments of the present disclosure. For example, glass-bump spacers 50 may have a height H that is too large for edge 28B to come within ≤1 micron of edge 28F. Accordingly, a glass shim or glass segment (e.g., glass gasket) may be placed between surfaces 24F and 24B to fill a gap 28 (not shown) between glass panes 20B and 20F. Gap 28 may have a height, for example, from about 2 microns to about 2 mm. In this embodiment, glass-bump spacers 50 are in contact with the opposing pane when the shim or glass segment fills gap 28. The glass shim or glass segment have also have a thin film or absorbent layer (e.g., low emissivity layer, low melting glass, thin absorbent film) on one or both of its major surfaces facing surface 24F or opposite the surface contacting thin film or absorbent layer on surface 24B. That is, glass shim or glass segment may have thin films or absorbent layers to effectuate sealing between itself and one or both of glass panes 20B or 20F. Example configurations of glass shim or glass segment between opposing glass panes and methods of sealing (including by laser-induced absorption) are provided in U.S. Patent Application No. 62/245,020 entitled "INTERLOCKED LASER SEALED GASKET FOR SEALED DEVICE" and in co-pending U.S. Patent Application No. 62/260,754 entitled "SEALED DEVICE WITH SEALING GASKET COATED WITH LOW MELTING INORGANIC MATERIAL" the entire contents of which are incorporated by reference herein. The glass shim(s) or glass segment(s) are shown between opposing panes in FIGS. 2 and 4A-C. In an exemplary embodiment, edge seal 30 is created between glass panes 20B and 20F and the glass shim or glass segment there between in a single translation of laser beam 102 radiation through glass panes 20B and 20F and the glass shim or glass gasket. That is, laser beam 102 may locally heat and melt several layers of thin film or absorbent layer to several layers of glass pane edges in a single translation.

In another embodiment, glass-bump spacers 50 and edge 28B, for example, may be chemically etched out of glass pane 20B. In this embodiment, height H of glass-bump spacers 50 would have the same height as edge 28B from surface 24B of glass pane 20B. Accordingly, top portion 51 of glass-bump spacers 50 and edge 28B could be brought into contact with friction reduction material 25 on surface 24F of glass pane 20F. Example methods of forming the etched structures described above in a glass pane are provided in U.S. Patent Application No. 62/248,715 entitled "VACUUM INSULATED GLASS UNITS AND METHODOLOGY FOR MANUFACTURING THE SAME" the entire content of which is incorporated by reference herein.

Sealed interior region 40 is preferably at least partially evacuated so that it has a vacuum pressure of less than one atmosphere (e.g., $10^{-6}$ torr), which provides VIG window 10 with desirable thermal and acoustic insulation properties. In embodiments, edge seal 30 around the respective outer edges 28F and 28B of front and back glass panes 20F and 20B creates a hermetically sealed interior region 40 between surfaces 24F, 24B of front and back glass panes 20F and 20B.

Methods of making VIG window 10 of the present disclosure include irradiating glass pane 20B with laser radiation or contacting glass pane 20B with a chemical etchant to form a plurality of glass-bump spacers 50 on surface 24B. Methods also include depositing the friction reduction material precursor formulation onto at least one of the glass-bump spacers 50. Methods also include arranging surface 24B adjacent of glass pane 20B and substantially parallel to a surface 24F of glass pane 20F. In exemplary embodiments, surface 24F of glass pane 20F includes low emissivity layer 25. In other embodiments, glass-bump spacers 50 on surface 24B contact low emissivity layer 25 on surface 24F when glass panes 20F and 20B are arranged according to the present methods. In embodiments, the precursor formulation is between at least one of glass-bump spacers 50 and surface 24F. Methods of making VIG window 10 also include heating or baking the unit to about 350° C. to about 450° C., or event to about 500° C. to remove inorganics from the sealed interior region (e.g., from the precursor formulation) or to cure glass frit or shims acting as edge seal 30, or both.

Methods of making VIG window 10 also include bonding (edge sealing) glass pane 20F and 20B to create sealed interior region 40 between glass pane 20F and 20B by contacting low emissivity layer 25 with laser radiation having a predetermined wavelength. Methods of laser welding using a low emissivity coating is provided in co-pending U.S. Patent Application No. 62/260,802 entitled "LASER WELDING TRANSPARENT GLASS PANES USING A LOW EMISSIVITY COATING" the content of which is incorporated by reference herein.

FIG. 4A is a cross-sectional view similar to FIG. 2 and illustrates an example embodiment of a three-pane VIG window 10 that includes a middle glass pane 20M sandwiched between front pane 20F and back pane 20B. Middle glass pane 20M has a body portion 23M of a third glass material and has a front side 22M, a back side 24M and an edge 28M. Middle glass pane 20M may have the same or different thickness or material of construction, as glass panes 20F or 20B, or both. Middle glass pane 20M may undergo the same or different strengthening operation as glass panes 20F and 20B, or both.

First and second sets of glass-bump spacers 50 are respectively formed in both the front and back sides 22M and 24M of middle pane 20M and respectively serve to maintain distance DGA between middle glass pane 20M and front pane 20F, and distance DGB between the middle pane and back pane 20B. In this embodiment, friction reduction material 25 may be between top portion 51 of glass-bump spacers 50 and the opposing surface. In the example embodiment shown in FIG. 4A, multiple edge seals 30 are used, where one edge seal serves to seal at least respective portions of edges 28F and 28M, and the other edge seal serves to seal at least respective portions of edges 28M and 28B (see FIG. 4B). In another example embodiment, a single edge seal 30 serves to seal edges 28F, 28M and 28B.

FIG. 4B is similar to FIG. 4A, and illustrates an alternate example embodiment of a three-pane VIG window 10 FIG. 1 as viewed in the direction 1-1. In this embodiment, the second set of glass-bump spacers 50 are formed in inner surface 24B of back glass pane 20B rather than in the middle glass pane 20M. In this embodiment, friction reduction material 25 may be between top portion 51 of glass-bump spacers 50 and the opposing surface. FIG. 4B also illustrates an example embodiment where multiple edge seals 30 are used, as described above.

FIG. 4C is similar to FIG. 4B, and illustrates yet another alternate example embodiment of a three-pane VIG window 10, wherein the first set of glass-bump spacers 50 are formed in inner surface 24F of front glass pane 20F rather than in the middle glass pane 20M. In this embodiment, friction reduction material 25 may be between top portion 51 of glass-bump spacers 50 and the opposing surface. Thus, in the embodiment illustrated in FIG. 4C, the glass-bump spacers are formed in the inner and outer panes, while in the embodiment illustrated in FIG. 4A, the glass-bump spacers are formed in the middle pane.

As disclosed in detail above, one or more friction reduction material 25 locations can be exist between one or more surfaces of glass panes 20F, 20M, and 20B contacting top portion 51 of glass-bump spacers 50. For the sake of clarity, friction reduction material 25 has been omitted from the illustrated embodiments shown in FIGS. 1, 2 and 4A-C. Triple pane VIG window 10 embodiments provided in FIGS. 4A-C may be assembled similar and according to the methods described with respect to two-pane VIG window 10 described above.

EXAMPLES

The present disclosure will be further clarified with reference to the following examples. The following examples are illustrative and should not be construed as limiting.

Two soda-lime glass (SLG) panes (61 cm long by 61 cm wide by 3 mm thick) were cut into about ten 5 cm by 5 cm pieces for use in the following examples.

Example 1

For the following 10 tests, a pair of the glass panes where used. A glass-bump spacer was formed by laser-induction one pane in each of the 8 SLG pane pairs. Specifically, the 355 nm wavelength laser beam at 15 watts, was directed through and behind each of the glass panes to create a glass-bump spacer with a height of 150 microns and a diameter of 600 microns. Each glass-bump was plasma cleaned (i.e., via ionized gas bombardment) at 380° C. for about 3 hours to remove contaminates (e.g., particles) from the glass-bump surface. A precursor formulation was jetted (or printed) on to each glass-bump spacer then heat treated (i.e., baked) to mimic different VIG heating operations at (i) 380° C. for 3 hours to simulate organic burn off in a VIG window to prevent off-gassing of components after the vacuum sealed interior region is formed; (ii) 410° C. for 30 minutes to simulate frit curing if used to seal an edge of the VIG window; or (iii) both (i) and (ii). The applicable heat treatment is provided in Tables 1-3 for each test. During heat treatment, organics within the precursor formulation were removed forming the friction reduction material on each glass-bump.

The 10 SLG panes with glass-bumps were then paired with the other 10 SLG panes, the friction reduction material between the glass-bump and the opposing glass pane surface. Each pair of glass panes was placed in a Nanovea M1 Mechanical Tester (the "Tester") to simulate 40N and 160N loads (i.e., normal force) in a VIG window on the glass-bump contacting the opposing pane with a friction reduction material there between. Keeping the load the same for each of the 8 tests, each glass-bump was moved at 1.0 mm/min across 0.5 mm of the opposing pane while the Tester measured the normal force load ($F_N$) in newtons (N) and frictional force ($F_F$) in newtons (N) to calculate the coefficient of friction (CoF). The bump was then brought back 0.5 mm to its original position and the test was repeated twice more over the same area as the first pass to simulate linear thermal expansion and contraction in a VIG window.

Table 1 below provides the average (Ave.) $F_N$ load provided in each test and the resultant CoF between the glass-bump and the friction reduction coating for each of the three passes. Movement of the glass-bump back to its original position was not measured. The particle size distribution of 90 nm APS WS$_2$ in the precursor formulations in Tests 1-2 from Table 1 below is plotted in FIG. 6 as the red line (with square data points). The particle size distribution of the 2 micron APS WS$_2$ in the precursor formulations in Tests 7-10 from Table 1 below is plotted in FIG. 6 as the orange line (with circle data points).

TABLE 1

Testing Parameters and Results for Example 1

| Test | Precursor formulation | Heat Treatment | Thickness of composition after heat treatment | Ave. $F_N$ Load (N) | Pass 1 Static COF | Pass 2 Static COF | Pass 3 Static COF |
|---|---|---|---|---|---|---|---|
| 1 | 10 wt. % $WS_2$ powder from Sigma (with 90 nm APS) in 31.5 wt. % Texanol™, 54.0 wt. % methoxypropanol, & 4.5 wt. % HSAM | 410° C. for 3 hours | 500 nm -2 microns | 40 | 0.26 | 0.09 | 0.09 |
| 2 | | | | 160 | 0.28 | 0.22 | 0.25 |
| 3 | $WS_2$ aerosol from M K Impex Corp. (Product No. MK-WS2-SP) | 410° C. for 3 hours | ~20 microns | 40 | 0.22 | 0.12 | 0.11 |
| 4 | | | | 160 | 0.12 | 0.04 | 0.33 |
| 5 | 8.3 wt. % $WS_2$ powder from Sigma (with 90 nm APS) in 71 wt. % methoxypropanol, 17.0 wt. % propylene glycol & 3.8 wt. % HSAM | 380° C. for 3 hours then 410° C. for 30 mins. | 500 nm -2 microns | 40 | 0.29 | 0.125 | 0.125 |
| 6 | | | | 160 | 0.19 | 0.06 | 0.064 |
| 7 | 10 wt. % $WS_2$ powder from Sigma (with 2 micron APS) in 31.5 wt. % Texanol™, 54.0 wt. % methoxypropanol, & 4.5 wt. % HSAM | 380° C. for 3 hours then 410° C. for 30 mins | 2-8 microns | 40 | 0.08 | 0.1 | 0.1 |
| 8 | | | | 160 | 0.17 | 0.08 | 0.08 |
| 9 | | 380° C. for 3 hours | 2-8 microns | 40 | 0.15 | 0.08 | 0.08 |
| 10 | | | | 160 | 0.11 | 0.045 | 0.045 |

The CoF for each test in Table 1 above provides that friction reduction material 25 of the present disclosure may reduce the static CoF between glass-bump spacers and the opposing glass pane from 0.8-1 to about 0.01-0.6.

Example 2

In the same setup as in Example 1, the precursor slurry was printed onto the top of each glass-bump in 6 additional tests. A summary of the results are provided below in Table 2. The particle size distribution of 90 nm APS $WS_2$ in the precursor formulations in Tests 1-2 from Table 2 below is plotted in FIG. 6 as the red line (with square data points). The particle size distribution of the 2 micron APS $WS_2$ in the precursor formulations in Tests 3-6 from Table 2 below is plotted in FIG. 6 as the orange line (with circle data points).

TABLE 2

Testing Parameters and Results for Example 2

| Test | Precursor formulation | $D_{50}$ of $WS_2$ particles in precursor formulation | Print diameter on glass-bump | Heat Treatment | Ave. $F_N$ Load (N) | Pass 1 Static COF | Pass 2 Static COF | Pass 3 Static COF |
|---|---|---|---|---|---|---|---|---|
| 1 | 10 wt. % $WS_2$ powder from Sigma (with 90 nm APS) in 31.5 wt. % Texanol™, 54.0 wt. % methoxypropanol, & 4.5 wt. % | 680-850 nm | 250 microns | 380° C. for 3 h then 410° C. for 30 mins. | 40 N (bump failed on third pass) | 0.5 | 0.36 | 0.27 |
| 2 | | | 250 microns | | 160 N (bump failed on | 0.3 | 0.27 | 0.24 |

TABLE 2-continued

Testing Parameters and Results for Example 2

| Test | Precursor formulation | $D_{50}$ of $WS_2$ particles in precursor formulation | Print diameter on glass-bump | Heat Treatment | Ave. $F_N$ Load (N) | Pass 1 Static CoF | Pass 2 Static CoF | Pass 3 Static CoF |
|---|---|---|---|---|---|---|---|---|
|  | HSAM |  |  |  | third pass) |  |  |  |
| 3 | 10 wt. % $WS_2$ powder from Sigma (with 2 micron APS) in 31.5 wt. % Texanol ™, 54.0 wt. % methoxypropanol, & 4.5 wt. % HSAM | 1000-1200 nm | 210 microns |  | 40 N (bump failed on third pass) | 0.4 | 0.3 | 0.18 |
| 4 |  |  | 210 microns |  | 160 N | 0.05 | 0.04 | 0.04 |
| 5 |  |  | 360 microns |  | 40 N | 0.12 | 0.065 | 0.055 |
| 6 |  |  | 360 microns |  | 40 N (bump failed on first pass) | N/A |  |  |

Results show CoF value differences between 90 nm APS vs. 2 micron APS $WS_2$ particle coatings. The static CoF is 0.2-0.5 (at 40N and 160 N loads with three passes) for precursor formulations containing 90 nm APS $WS_2$ and heat treated at 380° C. for 3 hours then 410° C. for 30 mins. Meanwhile, the static CoF is 0.05-0.15 (at 40N and 160 N loads with three passes) for precursor formulations containing 2 micron APS $WS_2$ and heat treated at 380° C. for 3 hours then 410° C. for 30 minutes. Results show that particle density and thickness of the coating may be modified to maintain the static CoF<0.1. Also, precursor formulations containing 2 micron APS $WS_2$ particles showed low CoF at 40 and 160 N normal force experiments and remained with a lower CoF with the increased number of passes. The friction reduction materials with lower CoF resulted in no failure to the glass bump.

Example 3

In the same setup as in Example 2, the precursor slurry was printed onto the top of each glass-bump in 6 additional tests. A summary of the results are provided below in Table 3.

TABLE 3

Testing Parameters and Results for Example 3

| Test | Precursor formulation | Heat Treatment | Thickness of composition after heat treatment | Ave. $F_N$ Load (N) | Pass 1 Static COF | Pass 2 Static COF | Pass 3 Static COF |
|---|---|---|---|---|---|---|---|
| 1 | 20 wt. % $WS_2$ powder from Sigma (with 90 nm APS) in 76 wt. % Texanol ™ & 4 wt. % HSAM | 380° C. for 3 hours | 4-6 microns | 40 | 0.57 | 0.2 | 0.19 |
| 2 |  |  | 0.5-1 microns | 160 | 0.27 | 0.06 | 0.06 |
| 3 |  |  | 8-11 microns | 40 | 0.46 | 0.12 | 0.12 |
| 4 |  |  | 7-12 microns | 160 | 0.28 | 0.04 | 0.04 |
| 5 |  |  | 15-19 microns | 40 | 0.52 | 0.13 | 0.16 |
| 6 |  |  | 8-10 microns | 160 | 0.22 | 0.03 | 0.03 |

As used herein, the singular forms "a," "an," and "the" include plural referents unless the context clearly dictates otherwise. Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

What is claimed is:

1. A window comprising:
   a first glass pane comprising a first glass material, a first inner surface opposite a first outer surface, and a first outer edge;
   a second glass pane comprising a second glass material, a second inner surface opposite a second outer surface, and a second outer edge;
   at least one glass-bump formed from the first glass material on the first inner surface of the first glass pane;
   the first glass pane faces the second glass pane such that the at least one glass-bump on the first inner surface is adjacent the second inner surface of the second glass pane;
   a friction reduction material located between the at least one glass-bump and the second inner surface; and
   an edge seal between the first and second edges of the first and second glass panes that forms an interior region between the inner surfaces of the first and second glass panes.

2. The window of claim 1 wherein the friction reduction material is isolated between the at least one glass-bump and the second inner surface.

3. The window of claim 1 wherein the friction reduction material decreases a coefficient of friction between the at least one glass-bump and the second inner glass surface by at least about 20%.

4. The window of claim 1 wherein the friction reduction material has a thickness from about 1 nm to about 20 microns between the at least one glass-bump and the second inner surface.

5. The window of claim 1 wherein the friction reduction material comprises an inorganic component and a binder.

6. The window of claim 5 wherein the inorganic component comprises tungsten disulfide, molybdenum disulfide, tungsten diselanide, molybdenum diselanide, or combinations thereof.

7. The window of claim 5 wherein:
   the inorganic component is a powder with a particle size distribution from about 10 nm to about 4000 nm; and
   the inorganic powder has a median particle size D50 from about 40 nm to about 2000 nm.

8. The window of claim 5 wherein the friction reduction material comprises from about 1 wt. % to about 50 wt. % of the inorganic component.

9. The window of claim 5 wherein the binder comprises methyl silsesquioxanes, phenyl silsesquioxanes, polyhedral oligomeric silsesquioxanes, polysilsesquioxanes, alkali silicates, or combinations thereof.

10. The window of claim 5 wherein:
    the friction reduction material further comprises a filler composition with a thermal conductivity from about 0.01 W/m·K to about 1 W/m·K; and
    the filler composition comprises calcium silicate, cork, chalk, mica, or combinations thereof.

11. The window of claim 5 wherein the friction reduction material further comprises from about 0.01 wt. % to about 5 wt. % of an organic material.

12. The window of claim 10 wherein the organic material comprises Texanol™, methoxypropanol, siloxanes, propylene glycol, or combinations thereof.

* * * * *

UNITED STATES PATENT AND TRADEMARK OFFICE
CERTIFICATE OF CORRECTION

PATENT NO. : 10,760,325 B2
APPLICATION NO. : 15/779973
DATED : September 1, 2020
INVENTOR(S) : Michael Paul Heckman et al.

Page 1 of 1

It is certified that error appears in the above-identified patent and that said Letters Patent is hereby corrected as shown below:

In the Claims

Column 16, Line 5, Claim 6, delete "diselanide" and insert -- diselenide --, therefor.

Column 16, Line 5, Claim 6, delete "diselanide" and insert -- diselenide --, therefor.

Signed and Sealed this
Fifth Day of January, 2021

Andrei Iancu
*Director of the United States Patent and Trademark Office*